United States Patent [19]

Vu-Do

[11] 4,212,572
[45] Jul. 15, 1980

[54] GEAR TEETH ROTARY-SHAVING OR ROLL-FINISHING MACHINE

[75] Inventor: Quê Vu-Do, Meudon la-Forêt, France

[73] Assignee: Renault Industries Equipments et Techniques-Riet, Boulogne-Billancourt, France

[21] Appl. No.: 924,344

[22] Filed: Jul. 13, 1978

Related U.S. Application Data

[63] Continuation-in-part of Ser. No. 655,288, Feb. 4, 1976, abandoned.

[30] Foreign Application Priority Data

Feb. 7, 1975 [FR] France ............................ 75 03825

[51] Int. Cl.² .............................................. B23F 19/06
[52] U.S. Cl. .................................... 409/37; 29/159.2; 51/26; 409/49
[58] Field of Search ........................... 90/1.6 R; 408/3; 29/159.2, 90 B, 560; 51/26, 105 GG, 56 G, 95 GH, 105 HB, 123 G, 287; 409/33, 37, 49

[56] References Cited

U.S. PATENT DOCUMENTS

| 1,576,806 | 3/1924 | Blood | 29/90 B |
| 3,522,757 | 8/1970 | Lohrer | 90/1.6 |
| 3,548,172 | 12/1970 | Centner et al. | 408/3 X |
| 3,659,335 | 5/1972 | Bregi et al. | 90/1.6 X |

FOREIGN PATENT DOCUMENTS

| 1039310 | 8/1966 | United Kingdom | 90/1.6 |
| 1087708 | 10/1967 | United Kingdom | 90/1.6 |
| 1224140 | 3/1971 | United Kingdom | 29/159.2 |

OTHER PUBLICATIONS

*Gear Handbook*, First Edition, McGraw-Hill, N.Y. 1972 pp. 18-6 to 18-11 and 22-32 to 22-40.
*Modern Methods of Gear Manufacture*, Nat'l. Bench and Machine Div., Lear Siegler, Inc. 1972, pp. 132-139.

*Primary Examiner*—Z. R. Bilinsky
*Attorney, Agent, or Firm*—Fleit & Jacobson

[57] ABSTRACT

Machine for finishing gear wheel teeth by shaving or rolling by means of a toothed rotary tool adapted to operate in tight meshing engagement with the gear wheel for finishing the teeth thereof, which comprises means for supporting the tool along its axis of rotation, a motor for rotatably driving said tool, means for supporting said gear wheel along its axis of rotation, the two axes of rotation of the tool and gear wheel, respectively, having at least one common perpendicular, and motor means for generating between said tool support means and said gear wheel support means, three powered relative movements comprising a movement in a direction parallel to said common perpendicular and two movements transverse to each other in planes respectively perpendicular to said common perpendicular, the motor for rotatably driving said tool and the motors for producing said two transverse movements being responsive to synchronous programmable servo-control means.

4 Claims, 9 Drawing Figures

| TYPE OF TOOL / TYPE OF CYCLE | WITH ANNULAR SERRATIONS | WITH STAGGERED PATTERN SERRATIONS | WITHOUT SERRATIONS |
|---|---|---|---|
| AXIAL-TRAVERSE SHAVING | YES | YES (POSSIBLY) | NO |
| ANGULAR-TRAVERSE OR DIAGONAL SHAVING | YES | YES (FOR PRONOUNCED DIAGONAL ANGLES) | NO |
| RIGHT-ANGLE TRAVERSE OR UNDERPASS SHAVING | NO | YES | NO |
| PLUNGE FEED SHAVING | NO | YES | YES |
| ROLLING WITH PARALLEL AXES | NO | YES | YES |
| ROLLING WITH NON-PARALLEL AXES | NO | NO | YES |

FIG_1

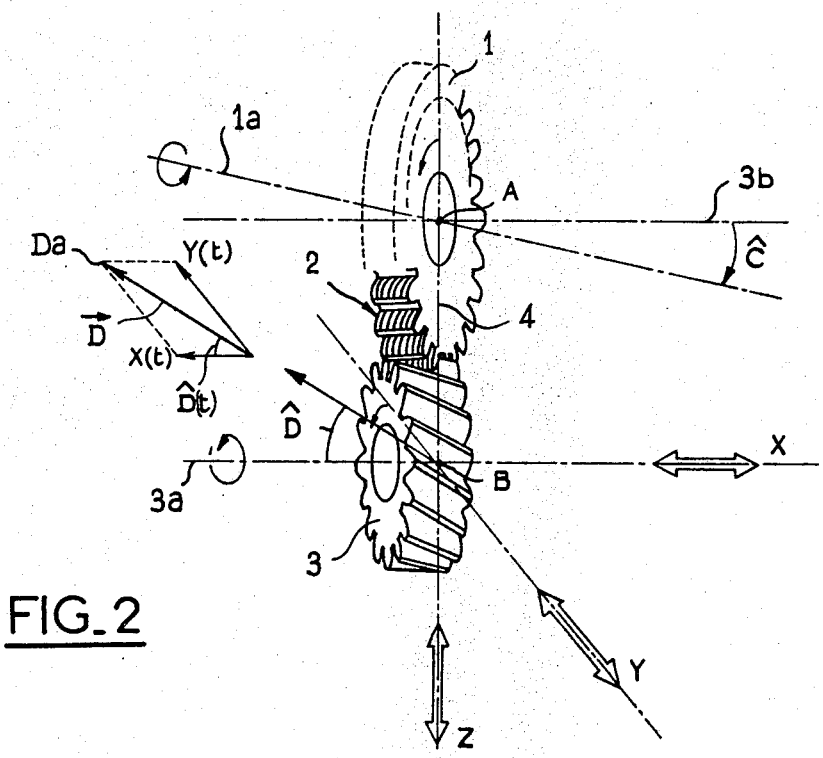
FIG_2
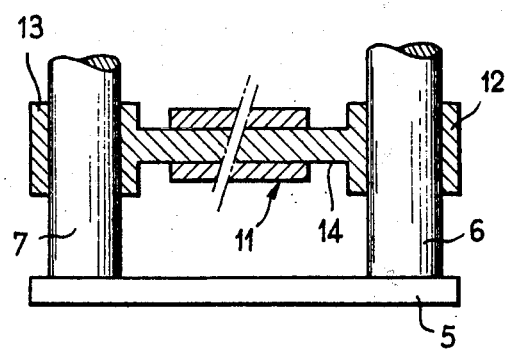
FIG_5
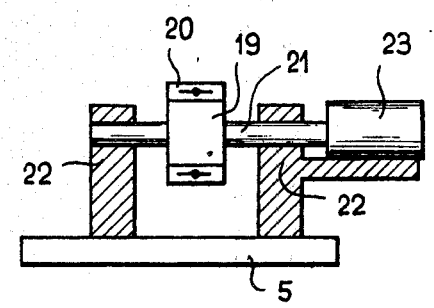
FIG_6

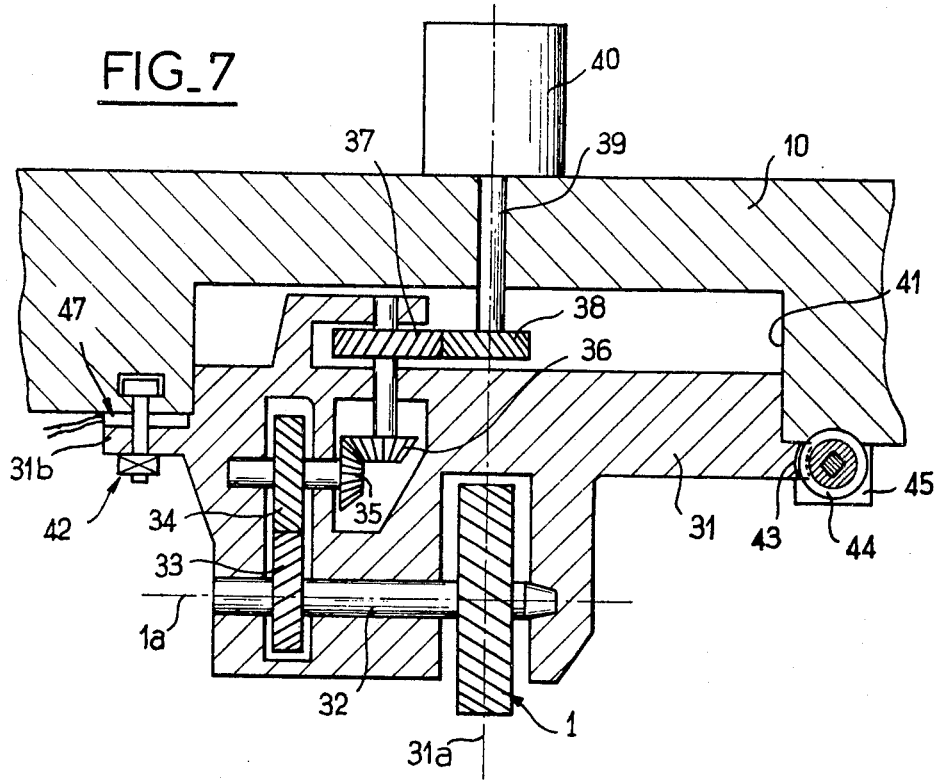
FIG_7
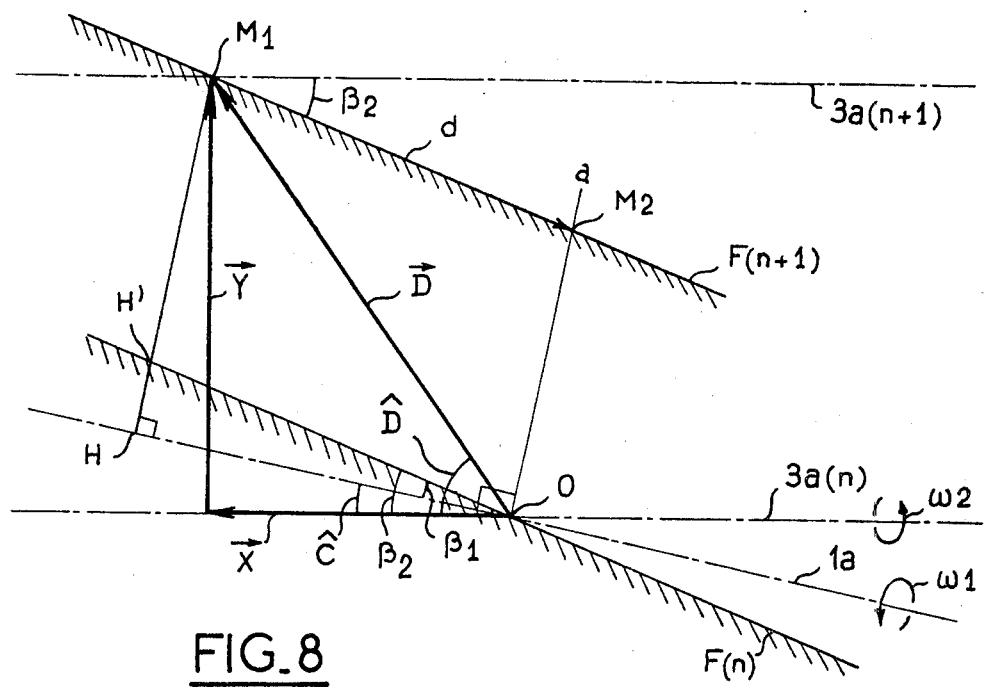
FIG_8

GEAR TEETH ROTARY-SHAVING OR ROLL-FINISHING MACHINE

This is a continuation-in-part of application Ser. No. 655,288 filed Feb. 4, 1976, now abandoned.

The present invention relates to improvements in machines designed to perform either rotary gear shaving or roll-finishing operations with gear shavers or rolling dies.

According to the present technique, gear teeth are usually finished by rotary shaving or rolling and more particularly by causing the workpiece to perform two relative movements with respect to the tool:

(a) conjugate rotations of the tool and workpiece in relation to their axes, which means the meshing thereof;

(b) shifting the workpiece axis in relation to the tool axis: this movement assists the cutting action (for the shaving operation) or the shaping action (for the rolling operation): thus, the workpiece is finished to the desired dimensions.

In the case of rotary shaving, the nature of the second above-defined movement permits of identifying the various methods of the technique applied nowadays. This movement is a rectilinear translation in a plane perpendicular to the perpendicular common to the tool and workpiece axes, which implies a predetermined setting of slideways according to a certain angle of feed designated by the letter D in the following disclosure, this angle D being distinguished from the so-called cross axis angle of the tool and workpiece axes which also generates a cutting creep during the meshing rotation of the tool and workpiece.

Now, assuming that the tool axis is fixed and the workpiece is movable, the following methods can be differentiated:

(c) the so-called "axial-traverse" shaving method wherein angle $D=0$ (d) the so-called "angular-traverse" shaving also called "diagonal" method wherein angle $D \neq 0$ (u) the so-called "right angle-traverse" shaving also called "underpass" method wherein angle $D=90°$ (p) the so-called "plunge-feed" shaving method.

It may be reminded that in a cutting tool for finishing a gear, by shaving, each tool tooth comprises an assembly of component elements called serrations and forming cutting edges which are distributed either annularly (annular pattern) along the tooth or irregularly. In this last case, the serrations are said to have a staggered pattern.

In a machine designed for the rotary shaving and/or roll-finishing of gear teeth, the axes of the workpiece and of the shaver or rolling die generally cross each other and the distance between these axes, measured on their common perpendicular, is referred to as the distance between centres or line of centres, the so-called plunge-feed movements causing these axes to move toward each other.

In roll-finishing in general a plain toothed tool is used, and in roll-finishing with parallel axes a tool with staggered pattern serration is used.

To sum up, the possibilities afforded by machines now available in the trade are shown in the table of FIG. 1 of the attached drawings, and greater details may be obtained regarding the present state of the art from "Gear Handbook", Darle W. Dudley, McGraw-Hill Book Cy. ed. (notably the 1st edition, pages 18–7 to 18–11 and 22–32 to 22–40).

The inconveniences characterizing all hitherto commercialized machines may be summarized as follows:

1. Existing machines have a specific character for they are intended for performing either only shaving operations or only rolling operations, or alternatively a rolling operation during only one shaving cycle (for example by underpass); or even rolling or shaving but without having the maximum rigidity of machines specially designed for one or the other mode of operation, respectively; or finally, during the machining of a same workpiece, performing the kinematics of a single cycle as listed in the Table of FIG. 1.

2. An optimum shaving or rolling operation cannot be obtained unless only one of the above-described cycle types is resorted to at one time. Therefore, this optimum shaving or rolling operation is limited, incomplete, and defective as far as the following points are concerned: cycle time, tool holding capacity (law governing the cutting or removal of material), quality of workpieces (surface finishing condition, for instance), since only one cutting law (cycle) can be applied at a time during a same machining cycle.

3. The change from one cycle type to another implies the change from one tool type to another, and sometimes even a change from one machine to another, which means lack of flexibility or versatility and a higher cost.

4. Therefore, obtaining an optimum shaving and rolling efficiency according to conventional methods with the presently available means constitutes an expensive and time-robbing operation, and moreover it is limited to well-defined, separate cycle types that cannot be combined simultaneously during the machining of a single workpiece.

5. Existing machines require compulsorily the use either of tools having staggered serrations, which are also expensive and involve complicated studies, for performing the cycles requiring shorter machining time periods (rolling, plunge feed shaving, underpass shaving, for instance); or tools with annular serrations, which are more economical and of simpler design, but applicable only to a limited number of well-defined cycles.

The cutting law of serrated tools is governed mainly by the specification tool design and construction (serrating law). The change from one cutting law to another which is necessary for an optimum gear machining operation requires the change from one tool type to another. Moreover, this law is a constant during a same machining cycle and cannot be defined in any conventional manner due to the tool stress.

The various inconveniences described hereinabove can be avoided with the present invention which provides a machine based on a novel principle whereby all gear teeth finishing operations can be accomplished under the optimal conditions that are simply choosen, without resorting to sophisticated tools or changing the settings or adjustments of the machine for completing the desired finishing operations.

For this purpose, the present invention is directed to provide a machine for the rotary shaving or roll-finishing of gear teeth by means of a toothed rotary tool consisting of a gear cutter or a rolling die adapted to operate under tight meshing conditions with a gear wheel or pinion for finishing the teeth thereof, a motor for rotatably driving the tool, means for supporting said toothed wheel along its axis of rotation, the axes of rotation of said tool and said gear wheel having at least one common perpendicular, and motor means for generating, between said tool support means and said gear teeth support means, three relative powered movements comprising: a movement parallel to said common perpendicular and two movements that are transverse to each other in planes perpendicular, respectively, to said common perpendicular, the motor for rotatably driving the tool and the motors producing said two transverse movements being responsive to synchronous programmable servo-control means.

According to a preferred embodiment, the programmable servo-control means of the motors producing said two transverse movements are synchronized with the servo-control means for rotatably driving the tool through means of the latter responsive to the real rotational speed of the tool.

Also preferably, a stress sensor is associated with one of said tool and gear-wheel support means for detecting the time when the tool engages the workpiece as a consequence of said movement in a direction parallel to said common perpendicular and stopping the corresponding motor, the means for putting said servo-control means into operation being responsive to the detection made by said stress sensor.

It may be seen that the actual structure of the machine may be of any desired and suitable type, provided that it produces the above-defined three-powered relative movements which may be applied indifferently to the gear wheel to be finished alone or to the tool, or be divided, i.e. by applying one of the three movements to the tool or to the gear wheel, and the other two movements to the gear wheel or to the tool. Therefore, the invention will be described hereinafter only with reference to a typical embodiment that should not be construed as limiting the scope of the invention, notably in connection with the structures intended to produce and apply the three relative movements described hereinabove.

In the accompanying drawings:

FIG. 1 is a table summarizing the various tool types and shaving and roll-finishing cycles known in the art;

FIG. 2 is a perspective view illustrating the mutual meshing engagement between a rotary shaver and a toothed wheel for shaving the latter;

FIGS. 5 and 6 are detail views showing in section details and taken along the lines V—V and VI—VI of FIG. 3, respectively;

FIG. 7 is a sectional view illustrating the mounting and drive of the tool, the section being taken along the line VII—VII of FIG. 3;

Figure 3:
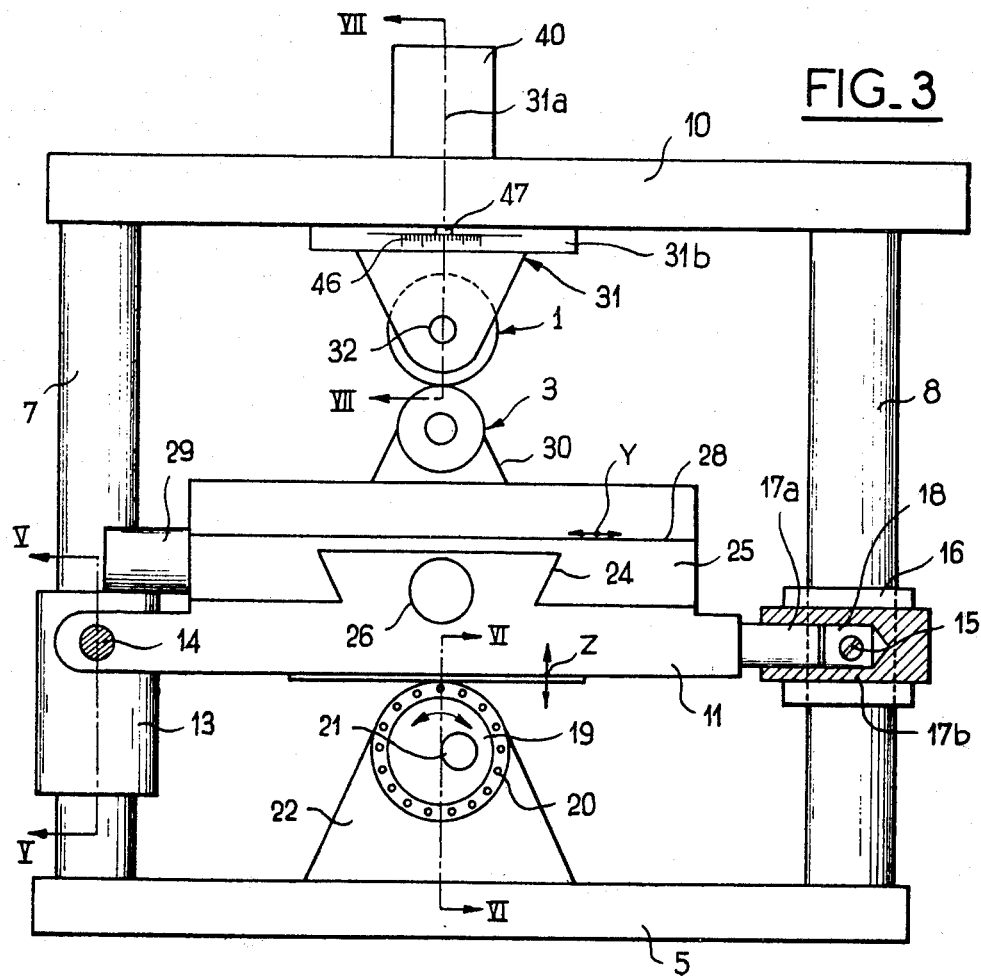
FIG. 3 is a diagrammatic part-section, part-elevational view illustrating one form of embodiment of a machine according to the present invention.
Figure 4:
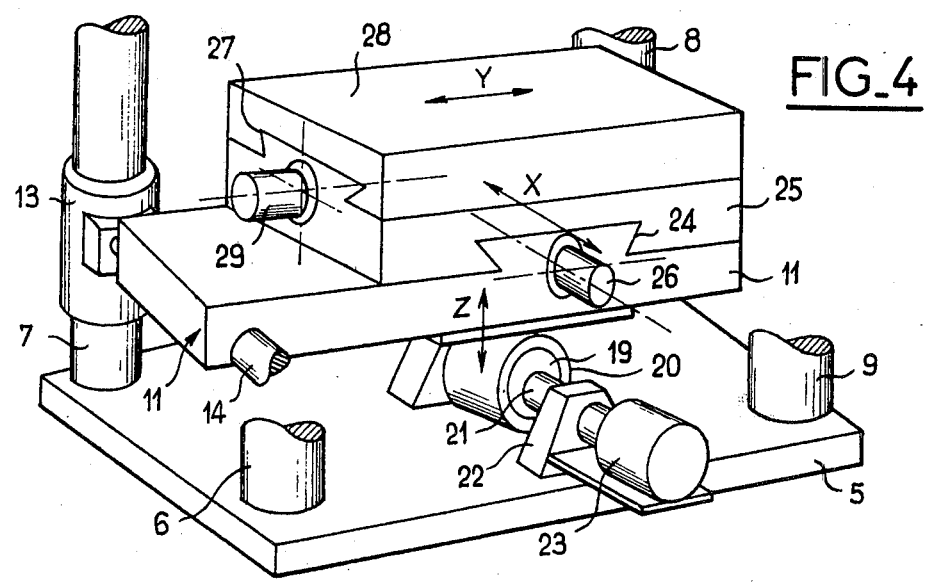
FIG. 4 is a perspective view with parts broken away of the machine shown in FIG. 3.
Figure 9:
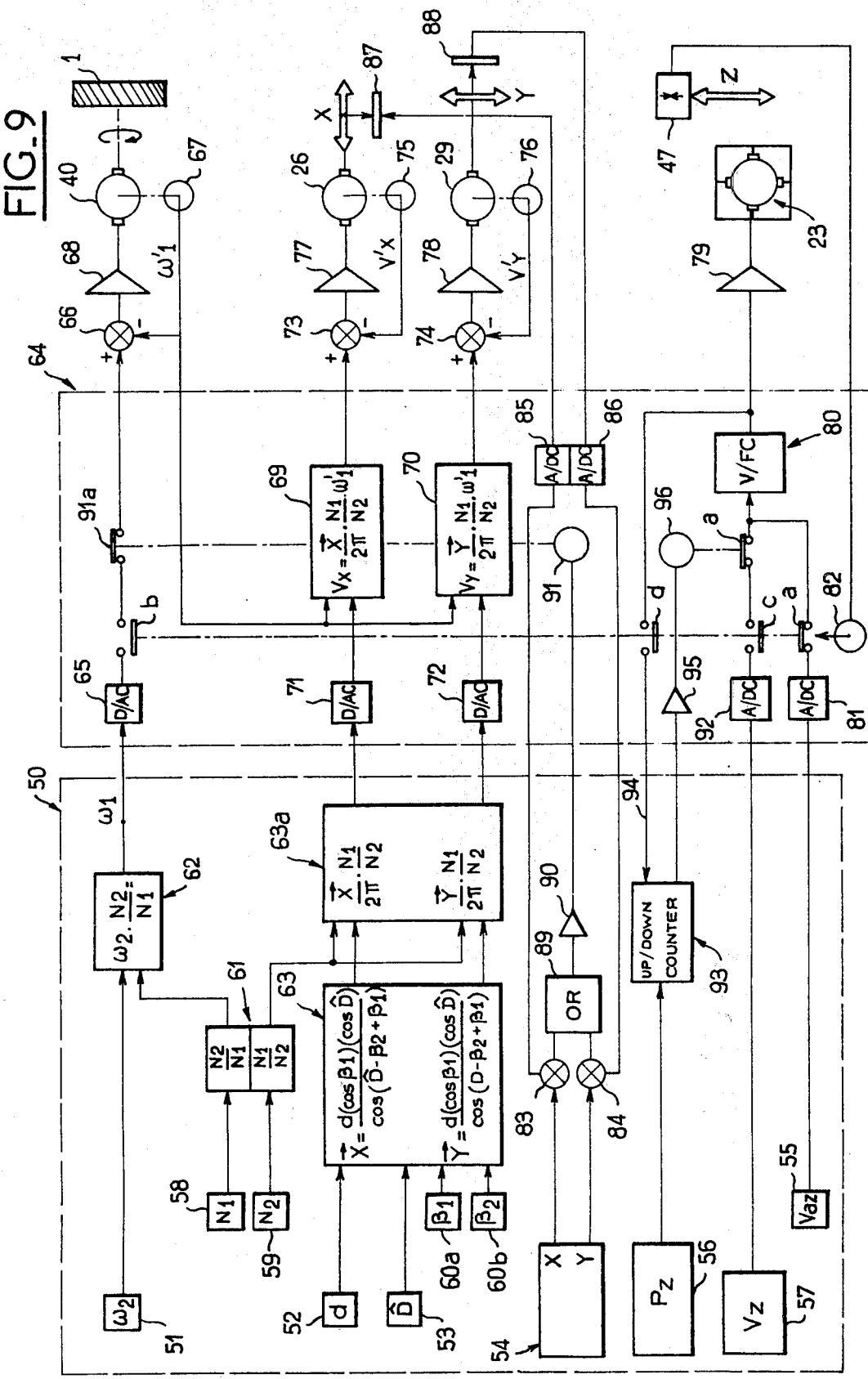

FIG. 8 is an explanatory diagram illustrating the feed kinematics of the machine, which corresponds to the projection upon a horizontal plane of the tool and workpiece movements between two revolutions n and n+1 of the workpiece, and FIG. 9 is a block diagram illustrating the principle of a typical form of embodiment of a programmable servo-control system for the motors producing the movements of the machine.

FIG. 2 shows the meshing engagement between a toothed rotary shaver 1 having serrated tooth-sides 2, and a toothed wheel 3 to be shaved. As customary in the art, the helix angles of the tool 1 and of the workpiece or wheel 3 differs (one of them being zero, eventually) and in their position of mutual meshing engagement their axes 1a and 3a, respectively, extending in parallel horizontal planes, form a cross axis angle evidenced at $\hat{C}$, with 3b designating the parallel to 3a passing through the point A of axis 1a of tool 1 through which the perpendicular common to both axes 1a and 3a also passes so as to intersect the axis 3a at B. This last-mentioned perpendicular is referred to as the "center line" or "pivot point."

The cross axis angle $\hat{C}$ generates a certain helical cutting creep during the tight rotary meshing engagement between the shaver 1 and the wheel 3, this rotation being shown by arrows in this example. In presently known shaving machines the shaver or the gear wheel to be shaved (in this example the wheel 3) is moved by translation in a plane perpendicular to said common perpendicular 4 or line of centre with an angle of feed $\hat{D}$ measured in relation to the axis 3a of the gear wheel, the value of this angle of feed $\hat{D}$ determining the feed of the sweeping of the tooth sides on the wheel 3 by the tool 1.

This angle $\hat{D}$ is the one already mentioned as the element by which the main methods known in the present state of the art can be distinguished from one another; this angle is obtained in known machines by means of a pivoting structure of which the pivot point is that of said common perpendicular 4 of the tool 1 and wheel 3, and this pivoting structure comprises a slideway on which a carriage supporting the toothed wheel to be shaved is adapted to move, after locking said pivoting structure in the desired direction Da for the corresponding pass or passes of the shaving cycle.

Any change in the angle of feed $\hat{D}$ during a shaving cycle involves the necessity of loosening, adjusting and relocking the pivoting structure.

Known machines also comprise either means for adjusting the centre line AB along the coordinates axis Z, or possibly a movement controlled along this axis Z for modifying the absolute pass depth, notably in the above-mentioned plunge feed shaving method or in the previously mentioned rolling methods. In a shaving machine according to this invention, the desired direction of feed Da is obtained by means of two compound transverse movements in a plane perpendicular to the common perpendicular 4, such that the orthogonal movements X and Y of FIG. 2, of which in this case one is merged with the axis 3a of the wheel 3 to be shaved, so that, as illustrated by the vectors in FIG. 1, simultaneous movements X(t) and Y(t) give a direction of feed Da forming a corresponding angle $\hat{D}(t)$ with the X-axis. Thus, the direction Da and therefore the shaving mode can be modified at will both during a pass and during successive passes of the shaving cycle, by controlling accordingly the velocities of the movements produced along the axes X and Y, respectively. In this respect, it will be noted that these movements along X and Y are not compulsorily orthogonal since they may be only transverse movements, the orthogonal solution being only the preferred one.

In the form of embodiment of a machine according to this invention, shown in FIGS. 3 to 7 of the drawings, this machine comprises a frame structure consisting essentially of a rectangular base plate 5, of four vertical columns 6, 7, 8 and 9 disposed at the corners of said base plate, and of a top plate 10 supported by the columns 6 to 9. An intermediate bed 11 is mounted for vertical movement between these columns.

The machine comprises on one side a sliding coupling along the columns 6, 7 in the form of a pair of sleeves 12, 13 connected to the bed 11 by means of a horizontal support and pivot pin 14.

On the opposite side, the bed 11 is mounted for pivotal movement about a horizontal pivot pin 15 parallel to the preceding one 14 and supported by a pair of sleeves 16 adapted to be locked at the desired level on the columns 8 and 9. The pivotal coupling between the bed 11 and the pivot pin 15 takes place in this example through a sliding joint of which the male member 17a is rigid with the bed and the female member 17b is connected to the pivot pin 15 by means of a plug 18.

The vertical movement of bed 11 which corresponds to a movement in the coordinate or Z-axis of FIG. 2 is controlled by means of an eccentric 19 mounted in a ball bearing 20, the pivot pin 21 of this eccentric, supported by bearing brackets 22 secured to the base plate 5, being rigidly coupled to the output shaft of a drive motor 23.

The bed 11 is provided with a dovetail slideway 24 supporting and guiding a movable table 25 adapted to be moved in the direction of the aforesaid coordinates axis X by means of a conventional screw and nut mechanism (not shown) coaxial to the slideway and having its screw controlled by a motor 26.

The movable table 25 carries in turn another slideway 27 for supporting and guiding in a transverse direction a top table 28 movable in the direction of the aforesaid coordinates axis Y by means of another conventional screw and nut mechanism (not shown) coaxial to the slideway 27 and having its screw connected to the output shaft of another motor 29. This table 28 carries on its top a fixed bracket 30 adapted to support the gear or toothed wheel 3 to be shaved for rotation about an axis parallel to said axis X.

The top plate 10 has pivotally mounted to its bottom face a tool carrier plate 31 adapted to be locked in the desired angular position, as will be explained presently, about a vertical axis shown diagrammatically at 31a and corresponding in this machine to said common perpendicular 4 of the diagram of FIG. 2, this axis 31a crossing by construction the geometric axis 1a of the toothed tool 1 mounted in turn on a shaft 32 supported for rotation in the tool carrier. As clearly shown in FIG. 7, this shaft 32 is adapted to be rotatably driven via a train of spur gears 33, 34 of a pair of bevel gears 35, 36 and of another train of spur gears 37, 38 of which the driving pinion 38 is rigid with the output shaft 39 of a motor 40, this shaft 39 being also aligned with the aforesaid geometric axis 31a. The tool carrier table 31 is adapted to swivel in a blind bore 41 formed in the bottom face of top plate 10 and is retained therein by means of a plurality of anchor bolts 42 having their heads engaged in a T groove of said top plate 10, the screw-threaded shank of these bolts being provided with a corresponding nut and extending through a hole formed in a flange 31b of the tool carrier table 31. This flange 31b further comprises along one portion of its outer periphery a plurality of worm teeth 43 meshing with a tangent worm 44 enclosed in an insert-forming casing 45 secured to the top plate 10. When the bolts 42 are released, the tool carrier table 31 can be pivoted to the proper extent in its plane with respect to the top plate 10, in this example with the assistance of a vernier 46 carried by flange 31b and by actuating the worm and nut device 44, 43 so as to display on said vernier, before re-locking the bolts 42, the aforesaid cross axis angle $\hat{C}$ shown in FIG. 2.

Inserted between the tool carrier plate 31 and the top plate 10 is a stress sensor designated diagrammatically by the reference numeral 47, for the purpose of delivering an electric signal when a predetermined contact pressure between the toothed wheel 3 to be shaved and the toothed tool 1 is attained, as the wheel 3 is moved in an approach feed direction by the motor 23 along the axis Z until this wheel 3 is in tight meshing engagement with the tool 1. The electric signal delivered by the sensor 47 is utilized for starting the shaving cycle. With this arrangement it is thus possible to have a predetermined amount of material removed during the shaving cycle and within the range of tolerances contemplated for the dimensions of the teeth of the wheel to be shaved, it being understood that the sensor 47 may also be interposed for the same purpose in the means associated with the wheel to be shaved or in the means associated with the tool.

In a shaving operation, the feed in the direction Da for sweeping the sides of the teeth of the wheel 3 by means of the gear shaver corresponds in fact to a predetermined shaving pitch or shift, per revolution of the workpiece (in this case the wheel 3), of the serrations of tool 1 along the sides of the teeth of said wheel 3.

Thus, in a machine according to this invention, a programmable motor servo-control system is provided for linking notably for the shaving operation the rotational speed of the tool driving motor 40 (and consequently the speed of wheel 3, as a function of the selected cutting speed) to the speeds of the driving motors 26 and 29 in the directions X and Y, as a function of the angle $\hat{D}$ and of the predetermined shaving pitch.

These programmable servo-control means may be of any known and suitable type, provided that they meet the above-mentioned interdependance requirements.

Preferably and advantageously, for optimizing the shaving operation such servo-control means may be of the type wherein the speeds of the drive motors 26, 29 at X and Y, respectively, are subordinate to the measured actual speed, not to the rated velocity of the motor 40 driving the rotary shaver 1.

A block diagram illustrating the basic principle of these programmable servo-control means is given in FIG. 9 on the basis of the relationship existing between the various data or parameters intervening in a shaving cycle and which may be derived from the object diagram of FIG. 8.

In this FIG. 8, illustrating the feed kinematics of the machine projected onto a horizontal plane, there is shown in parallel with FIG. 1 the axis 1a of the gear shaver 1 assumed to be in a fixed position, and the axis 3a of the toothed wheel 3 to be shaved, these two axes intersecting each other at a point O corresponding to the projection of line AB of FIG. 1.

The trace Oa of a cutting edge of the tool serrations extends perpendicularly to the axis 1a. The axis 3a of the toothed wheel 3 to be shaved bears the indices (n) and (n+1) corresponding to its position after (n) and (n+1) revolutions of this wheel. One tooth side is shown at F and bears likewise the indices (n) and (n+1).

The movement of wheel 3 from one revolution to another is shown by the vector $\vec{D}$ making an angle $\hat{D}$ with the axis 3a, so that after one revolution the point O is at $M_1$ while the contact between the tooth side and the cutting edge Oa involved lies at $M_2$, and "d" designates under these conditions the kinematic shift, per revolution, of the shaving feed, called the "shaving pitch".

The transverse movements on X and Y during one revolution are designated by the vectors $\vec{X}$ and $\vec{Y}$.

Besides, in this diagram the helix angle $\beta_1$ of the teeth of tool 1 and the helix angle $\beta_2$ of the teeth of wheel 3 to be shaved are also shown in the diagram, together with the cross axis angle $\hat{C}$.

Calculating with the assistance of this FIG. 8 the shifts per revolution corresponding to vectors $\vec{X}$ and $\vec{Y}$ for obtaining the resultant displacement $\vec{D}$ will give the following results:

$$\vec{X} = \vec{D}(\cos \hat{D})$$

$$\vec{Y} = \vec{D}(\sin \hat{D})$$

In triangle $OM_1H$: $OH = \vec{D} \cos (\hat{D} - \hat{C})$
In triangle $OHH'$: $OH = OH'(\cos \beta_1) = d(\cos \beta_1)$
hence:

$$\vec{D} = \frac{d(\cos \beta_1)}{\cos (\hat{D} - \hat{C})},$$

and since $\hat{C} = \beta_2 - \beta_1$ $$\vec{X} = \frac{d (\cos \beta_1)(\cos \hat{D})}{\cos (\hat{D} - \beta_2 + \beta_1)}$$
$$\vec{Y} = \frac{d (\cos \beta_1)(\sin \hat{D})}{\cos (\hat{D} - \beta_2 + \beta_1)}$$

Moreover, let $N_1$ be the number of teeth of the shaver 1, $N_2$ the number of teeth of the wheel 3 to be shaved, $\omega_1$ the velocity of rotation of the tool and $\omega_2$ the velocity of rotation of the wheel to be shaved, the linear velocities $V_x$ and $V_y$ at X and Y will be:

$$V_x = \vec{X}\frac{\omega_2}{2\pi} = \frac{\vec{X}}{2\pi} \cdot \frac{N_1}{N_2} \cdot \omega_1$$
$$V_y = \vec{Y}\frac{\omega_2}{2\pi} = \frac{\vec{Y}}{2\pi} \cdot \frac{N_1}{N_2} \cdot \omega_1$$

considering that $$\omega_2 = \frac{N_1}{N_2} \omega_1.$$

The programmable servo-control means shown in FIG. 9 comprise thus a digital electronic assembly 50 including means for selecting parameters expressed in digital values, i.e. a display-type digital input module 51 for $\omega_2$, 52 for d, 53 for $\hat{D}$, 54 for the one-pass displacements along X and Y, 55 for the workpiece-tool approach speed along Z, denoted Vaz, 56 for the absolute pass depth along Z, and 57 for the cutting speed Vz (these last two values in case of plunge feed shaving or rolling). The digital assembly also comprises digital input modules for displaying fixed data, i.e. 58 for $N_1$, 59 for $N_2$, 60a for $\beta_1$ and 60b for $\beta_2$.

The digital unit 50 comprises several computers, i.e. a first computer 61 for calculating $N_1/N_2$ and $N_2/N_1$, a computer 62 for calculating the regulation velocity $\omega_1$, another computer 63 for calculating $\vec{X}$ and $\vec{Y}$ according to the above formulas, and a computer 63a acting as an intermediate computer for calculating the linear velocities $V_x$ and $V_y$ without their parameter $\omega_1$.

The motor 40 for driving the shaver 1, and the motors 26 and 29 for driving along the X and Y lines are controlled by closed-loop servo-action means of the conventional analogue type, and an analogue electronic assembly 64 is interposed between the digital assembly 50 and these servo-action means.

The assembly 64 will thus comprise a digital-to-analogue converter 65 converting the digital value of velocity $\omega_1$ into a regulation voltage applied to a comparator 66 receiving on the other hand from a tachometric generator 67 a voltage depending on the actual speed $\omega'_1$ of the tool, the error voltage issuing from this comparator being applied to an amplifier 68 controlling accordingly the energization of the shaver driving motor.

This tachometric generator 67 also feeds this voltage corresponding to the actual speed $\omega'_1$ of the tool to the input of two analogue computers 69, 70 adapted to deliver regulation voltages corresponding to velocities $V_x$ and $V_y$, respectively, calculated by these computers from data received from the intermediate digital computer 63a and converted into voltages by the digital-to-analogue converters 71 and 72. The regulation voltages from analogue computers 69 and 70 are fed to comparators 73, 74, respectively, each receiving from a tachometric generator 75 and 76 a voltage corresponding to the actual velocity $V'_x$ and $V'_y$, the error voltages from comparators 73 and 74 being fed to amplifiers 77 and 78, respectively, controlling accordingly the energization of the motors driving the wheel 3 and tool 1 along the axes X and Y, respectively.

It will be noted that with this arrangement the displacements along the axes X and Y are controlled as closely as possible by the actual velocity $\omega_1$ of tool 1, which is particularly propitious to a proper execution of the programmed pass.

This execution of a shaving pass, after the initial positioning of the tool 1 and of the toothed wheel 3 to be shaved in a close-fitting meshing position, begins here with the datum concerning the contact engagement, under a predetermined effort, of the wheel 3 with the tool 1, which datum is given by the sensor 47 in response to an action controlling the movement along Z at the approach speed. The motor 23 producing this displacement along Z is of the well known step-by-step type energized through an amplifier 79 capable of amplifying the pulse emitted by a voltage-frequency converter incorporated in the electronic-analogue assembly 64, and receiving at its input an approach-speed regulation voltage via a digital-analogue converter 81 having its input connected to the approach-speed digital input module 55. Connected in series with the digital-analogue converter 81 is a back contact a of a relay 82 energized in response to the detection, by the effort sensor 47, of the contact established between the tool 1 and the wheel 3 under the predetermined stress. The opening of back contact a will thus discontinue the movement along Z. A front contact b of the same relay 82 interposed between the digital-analogue converter 65 and the comparator 66 will thus permit the application, to this comparator, of the regulation voltage corresponding to velocity $\omega_1$, so that the tool 3 will begin to be rotatably driven and at the same time the tachometric generator 67 will deliver the voltage corresponding to the actual tool velocity $\omega'_1$ both to the comparator 66 and to the analogue computers 69, 70 of velocities $V_x$, $V_y$, of which one input is energized from the digital-analogue converters 71, 72, the outputs of these computers 71, 72 being kept at zero value until then since the value of $\omega'_1$ is zero when the tool 3 is inoperative.

The thus started and programmed shaving pass may be discontinued as a function of the data issuing from the input module 54 of the displacements along X and Y when one of the displayed coordinates is attained.

The corresponding outputs of the input module 54 are fed to the inputs of two digital comparators 83, 84 receiving at their other inputs the digital data of the actual positions along X and Y as obtained from the analogue-digital converters 85, 86 connected to the analogue position sensors 87, 88 along X and Y, respectively. The coincidence of the input data on one of the comparators 83, 84 causes the logic OR circuit 89 to be energized which, via a gate 90, energizes in turn an end of machining relay 91 comprising a back contact 91a disposed for this purpose in series with the contact b of the starting relay 82.

In the case of machining operations comprising a feed movement along Z, such a plunge feed shaving or rolling, the digital input modules 56 for the pass depth Pz and 57 for the working speed Vz are utilized in combination with the approach-speed input module 55. To this end, the input module 57 is coupled to the input of a digital-analogue converter 92 having its output connected to the input of a voltage-frequency converter 80 via a front contact c of relay 82. The input module 56 is connected to the pre-loading inputs of an up-and-down counter 93, the negative input of which is connected by a conductor 94 to the output of a voltage-frequency converter 80 via a front contact d of the relay 82. Furthermore, an output of the up-and-down counter 93, which is energized at the zero state of this counter is connected via a gate 95 to another relay 96 having a back contact a in series with the front contact c of relay 82.

Thus, when the output of the approach-speed digital input module 55 is energized, a regulation voltage is delivered via the digital-analogue converter 81 and closed contact 82a to the voltage-frequency converter 80, the latter emitting pulses for actuating the step-by-step motor 23 driving the gear wheel in the vertical direction Z, at a rate corresponding to the desired approach speed between the gear wheel to be shaved and the tool. When the latter engages the wheel with the desired pressure, the stress sensor 47 causes the relay 82 to be energized and its contact a to open, thus discontinuing the application of the approach regulation voltage to the converter 80 provided for converting the regulation voltage corresponding to the working speed Vz and issuing from the digital-analogue converter 92. Simultaneously with contact c, the contact d of relay 82 also closes, whereby the pulses controlling the motor 23, delivered by the converter 80, are then fed to the negative counting input of the up-and-down counter 93 previously charged to a digital value derived from the input module 56 and corresponding to the absolute pass depth. Therefore, when the up-and-down counter 93 is reset, it energizes the relay 96 of which the contact a opens and discontinues the delivery of the regulation voltage corresponding to the working speed to the voltage-frequency converter 80, so that the step-by-step motor 23 driving in the direction Z is stopped at the desired pass depth, depending on the digit previously stored in the up-and-down counter 93.

For the sake of simplicity, the means for controlling the direction of rotation of the motors, both automatically and manually, have been omitted, since they are well-known to those skilled in the art.

It may also be pointed out that with the machine of the present invention, fully automatic cycles controlled by a sequential programming of the digital data delivered by the modules 51 to 57 and including the proper reversals of the direction of rotation of the motors may be contemplated without departing from the basic principles of the invention.

Such programming may also prove advantageous for a one-pass machining operation, with change in the machining conditions during the pass, provided that, notably in the case of shaving operations, a tool of sufficient width is available for sweeping the tooth sides to be shaved during the entire pass.

The machines constructed according to the teachings of this invention are characterized by the following advantageous features:

1. All existing conventional shaving and rolling cycles can be performed by the same machine;

2. It is possible to switch smoothly and continuously from one type of cycle to another during the machining of the same workpiece. Thus, one may change from a "diagonal" cycle to an "underpass" cycle during a same cycle sequence.

Therefore, the cutting or material-removal law of the tool may vary at will during the machining of a same workpiece.

3. Shaving and/or rolling cycles according to new kinematics can be obtained, with an infinity of possible combinations since any desired workpiece-to-tool relative movement can be produced. The cutting law is also immaterial, and therefore a "differential" shaving and rolling operation may be contemplated, for the following parameters may be modulated continuously and simultaneously by virtue of the specific kinematics of the machine, in contrast to conventional techniques wherein the tool construction limitates the choice of the cutting law:

| | cutting speed : direction and intensity; |
|---|---|
| | serrations cutting feed and direction of the shift along the flanks of the teeth of the workpiece |
| shape of chips: | depth of cut (variation of the workpiece to tool line of centers) |
| | type of cutting depending on the direction of the serrations cutting feed (in "opposition" or by "swallowing" the metal). |

4. Optimum rolling or shaving is also obtainable for the tool cutting law (cycle) can be varied at will and continuously, whereby the best possible compromise between:
the tool life,
the workpiece quality, namely the surface condition and the profile distortions (machining effects), and
the machining time, can be achieved.

5. Optimum shaving or rolling action may be obtained in a shorter time and more economically since it is no more necessary to change the tool when it is desired to change the cutting law: thus, it is only necessary to use another relative movement between the tool and the workpiece.

6. As a result, a great versatility and flexibility of use of the tool under normal production conditions are obtained since a change of cycle or workpiece does not compulsorily involve a change of tool or machine. Thus, the tool standardization is greatly simplified.

7. Tools having non-offset mortises may be used; these tools are simpler in design and more economical to manufacture, for the cutting law or the law of removal of material may be derived from the law governing the relative movement between tool and workpiece, which is of any desired type.

8. Since the law governing the relative movement between tool and workpiece is perfectly controlled, the total excess thickness to be shaved or rolled may be adjusted notwithstanding variations in the blank dimensions, whereby a longer tool life should be obtained.

This adjustment may be controlled by detecting the initial machining of the workpiece with the assistance of a sensor capable of detecting the workpiece machining stress or vibration, for example of the above-mentioned type, or alternatively by measuring the dimension of the rough-cut workpiece, this measurement being utilized for controlling the relative movement between the tool and the workpiece during the finishing operation.

9. The law of the relative movement between tool and workpiece being immaterial, specific tooth surfaces such as the surfaces of tapered or convex teeth may be programmed at will.

Of course, this invention should not be construed as being strictly limited by the specific forms of embodiment illustrated and described herein, which are given by way of illustration only; therefore, many modifications and changes may be brought thereto without departing from the basic principles of the invention as set forth in the appended claims.

What is claimed as new is:

1. Machine for finishing gear wheel teeth by shaving or rolling by means of a toothed rotary tool adapted to operate in tight meshing engagement with the gear wheel for finishing the teeth thereof, which comprises means for supporting the tool along its axis of rotation, a motor for rotatably driving said tool, means for supporting said gear wheel along its axis of rotation, the two axes of rotation of the tool and gear wheel, respectively, having at least one common perpendicular, three motorized driving means for generating respectively between said tool support means and said gear wheel support means, three powered relative movements consisting of a movement in a direction parallel to said common perpendicular and of two movements transverse to each other in planes respectively perpendicular to said common perpendicular, and synchronous programmable servo-control means for controlling said motor for rotatably driving said tool and the two motorized driving means for producing said two transverse movements.

2. Machine according to claim 1, wherein said programmable servo-control means for controlling said motor for rotatably driving said tool include means for measuring the real velocity of the tool and being connected to enter the measured real velocity into the programmable servo-control means for controlling the two motorized driving means producing said two transverse movements.

3. Machine according to claim 1, wherein a stress sensor is associated with one of said means for supporting for detecting the engagement between the tool and the wheel as a consequence of the aforesaid movement in a direction parallel to said common perpendicular and for stopping the corresponding motorized driving means and wherein means for starting said servo-control means are responsive to the detection accomplished by said stress sensor.

4. Machine according to claim 1, characterized in that it comprises a column-type frame structure, a plate vertically movable on said frame structure for producing said movement in a direction parallel to said common perpendicular, a table mounted for guided translation on said plate according to one of said two transverse movements, a second table mounted for guided translation on said first table along the second one of said two transverse movements, said second table comprising said means for supporting said gear wheel, and a top plate overlying the columns of said frame structure and wherein said tool support means are mounted for movement about a geometric axis having a direction parallel to said common perpendicular.

* * * * *